US008564590B2

(12) United States Patent
Wu et al.

(10) Patent No.: US 8,564,590 B2
(45) Date of Patent: Oct. 22, 2013

(54) IMPARTING THREE-DIMENSIONAL CHARACTERISTICS IN A TWO-DIMENSIONAL SPACE

(75) Inventors: Tai-Pang Wu, Hong Kong (CN);
Chi-Keung Tang, Hong Kong (CN);
Michael S. Brown, Singapore (SG);
Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 971 days.

(21) Appl. No.: 11/771,694

(22) Filed: Jun. 29, 2007

(65) Prior Publication Data
US 2009/0002363 A1 Jan. 1, 2009

(51) Int. Cl.
*G06T 15/00* (2011.01)

(52) U.S. Cl.
USPC .......................................... 345/419; 345/619

(58) Field of Classification Search
None
See application file for complete search history.

(56) References Cited

U.S. PATENT DOCUMENTS

| 5,237,647 | A * | 8/1993 | Roberts et al. ................. 345/419 |
| 6,414,679 | B1 * | 7/2002 | Miodonski et al. ............ 345/420 |
| 6,549,201 | B1 | 4/2003 | Igarashi et al. |
| 6,795,069 | B2 | 9/2004 | Raskar et al. |
| 7,034,832 | B2 * | 4/2006 | Yamauchi et al. ............ 345/473 |
| 7,065,242 | B2 | 6/2006 | Petrov et al. |
| 7,154,498 | B2 | 12/2006 | Cowan et al. |
| 7,199,793 | B2 | 4/2007 | Oh et al. |
| 7,212,197 | B1 | 5/2007 | Schkolne et al. |
| 7,388,580 | B2 * | 6/2008 | Birdwell ........................ 345/426 |
| 7,394,469 | B1 * | 7/2008 | Liu et al. ........................ 345/594 |
| 2005/0062739 | A1 * | 3/2005 | Balmelli et al. ............... 345/426 |
| 2006/0082571 | A1 | 4/2006 | McDaniel |
| 2007/0109310 | A1 | 5/2007 | Xu et al. |

OTHER PUBLICATIONS

Igarashi, et al., "Smooth Meshes for Sketch-based Freeform Modeling", available at least as early as Jun. 7, 2007, at <<http://www-ui.is.s.u-tokyo.ac.jp/~takeo/papers/i3dg2003.pdf>>, pp. 4.

Owada, et al., "A Sketching Interface for Modeling the Internal Structures of 3D Shapes", available at least as early as Jun. 27, 2007, at <<http://www-ui.is.s.u-tokyo.ac.jp/~takeo/papers/owada-smartgraphics2003.pdf>>, pp. 9.

Schmidt, et al., "ShapeShop: Sketch-Based Solid Modeling with BlobTrees", at <<http://www.unknownroad.com/publications/ShapeShopSBM05.pdf>>, The Eurographics Associationi, 2005, pp. 10.

Wyvill, et al., "Sketch Based Construction and Rendering of Implicit Models", at <<http://www.unknownroad.com/publications/SketchAesthetics05.pdf>>, The Eurographics Association, 2005, pp. 8.

Chinese Office Action mailed Oct. 26, 2011 for Chinese patent application No. 200880022587.9, a counterpart foreign application of U.S. Appl. No. 11/771,694, 9 pages.

* cited by examiner

*Primary Examiner* — Said Broome
(74) *Attorney, Agent, or Firm* — Lee & Hayes, PLLC (57) ABSTRACT

Processes and techniques for imparting three-dimensional visual characteristics to images in a two-dimensional space are described. In one implementation, a graphical image is received in a two-dimensional space (e.g., a user interface on a computing device). A shape palette is presented to a user, the shape palette comprising a visual representation of three-dimensional visual information. Based on user markup of the shape palette, three-dimensional visual information is extracted from the shape palette and correlated with the graphical image. The three-dimensional visual information is processed to render the graphical image with three-dimensional visual characteristics.

15 Claims, 7 Drawing Sheets

A shape palette can be generated using an orthographic projection of a 3D shape model and can store the inner product of a synthetic light and the 3D normal at each point in the projection (i.e., the shape palette utilizes Lambertian shading, for example). Shape palettes can consist of any suitable 3D model, such as sphere, a cone, a torus, and so on. Suitable ways of processing the 3D normal information from a shape palette to produce a dense normal field are discussed below.

Illustrative User Interface

Figure 1:
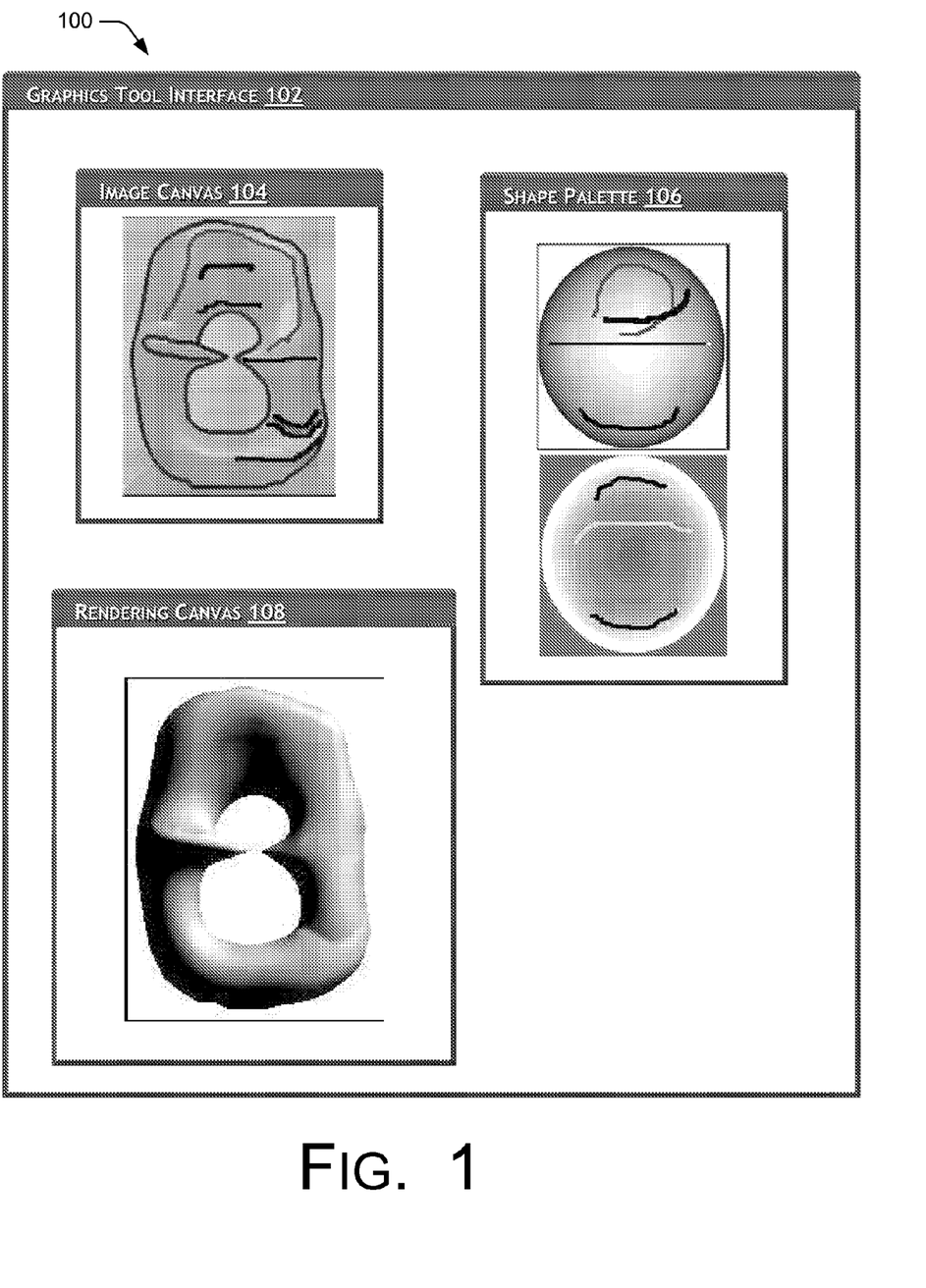

FIG. 1 shows at 100 a graphics tool interface 102 that can implement the described processes and techniques. Graphics tool interface 102 is presented for purposes of example only, and the described processes and techniques can be implemented using different types and arrangements of user interfaces. Graphics tool interface 102 can be generated and/or displayed using any suitable device, including a desktop computer, a laptop, a personal digital assistant (PDA), a cellular phone, and so on. In this context, graphics tool interface 102 exists in a 2D space (i.e., the tool is displayed on a 2D interface, such as a computer monitor).

Graphics tool interface 102 includes image canvas 104. Image canvas 104 enables a user of graphics tool interface 102 to provide shapes and/or markup to which the user wishes to impart 3D visual characteristics. Also included in graphics tool interface 102 is shape palette 106. Shape palette 106 is configured to receive user markup, and based on the user markup, to impart 3D information to the shapes and/or markup indicated in image canvas 104. Rendering canvas 108 displays an image that is rendered based on the shapes and/or markup from image canvas 104 and the user markup provided in shape palette 106.

In operation, a user provides an image and/or markup in image canvas 104. Markup refers generally to providing strokes, lines, curves or other graphic input, such as by using a freehand tool as part of a graphics application. In one example, a user can import an image file (e.g., in JPEG, bitmap, or any other suitable graphics format) to the image canvas and use the image as a stencil over which markup can be provided in the image canvas. As the user provides markup in the image canvas, the user provides corresponding markup in the shape palette. For example, a user can make a stroke in image canvas 104 and make a corresponding stroke in shape palette 106. The graphics tool will automatically correlate the two strokes and impart the 3D information indicated by the shape palette stroke to the corresponding stroke in image canvas 104. However, as discussed below, other methods may be used to correlate shape palette markup with image canvas markup. This markup correlation is discussed in more detail below. Based on the correlation between the image canvas markup and the shape palette markup, an image is rendered in rendering canvas 108. The image rendered in rendering canvas 108 includes 3D visual characteristics extracted from shape palette 106 (e.g., Lambertian shading).

Figure 2:
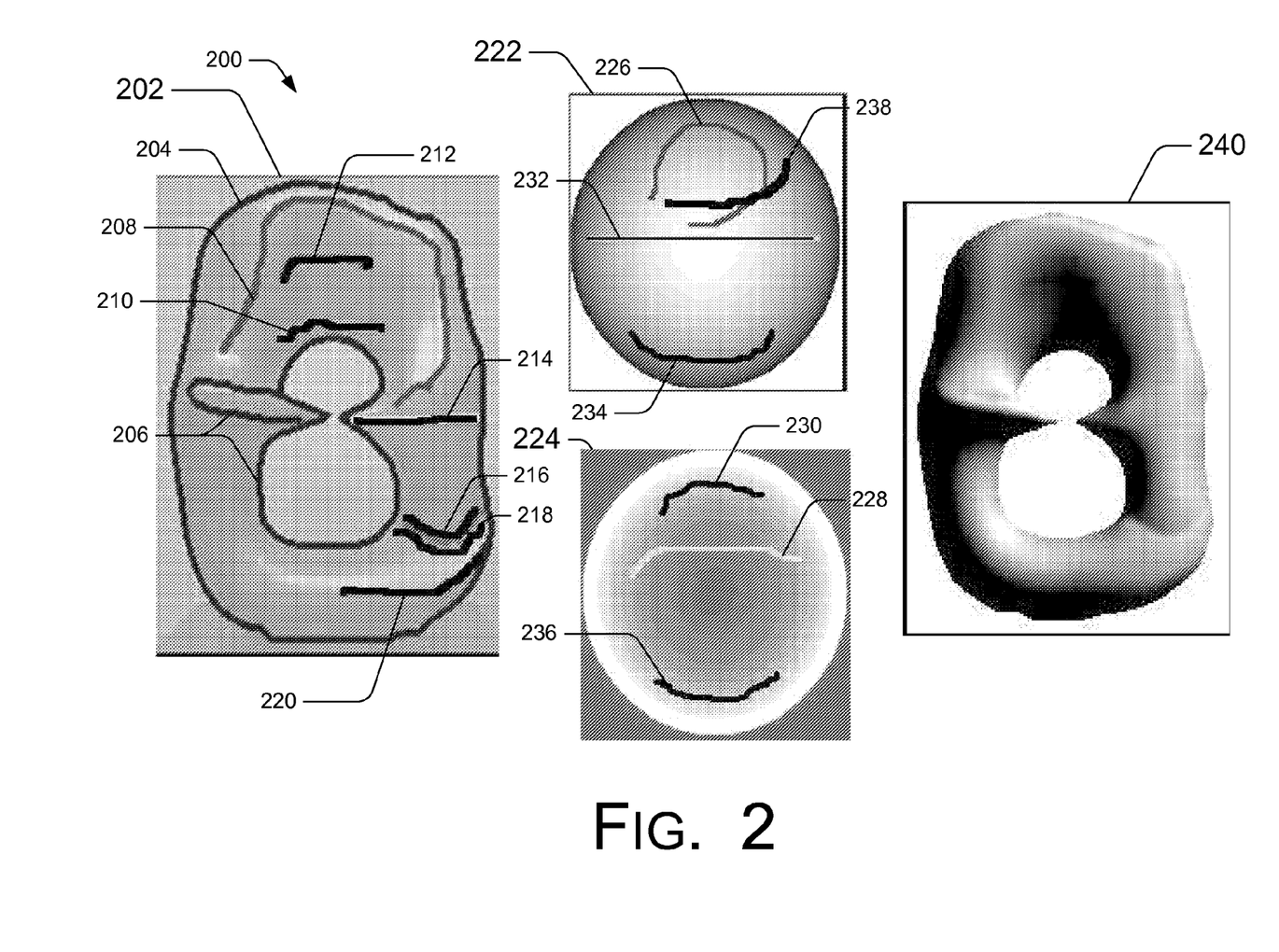

FIG. 2 shows, at 200, one example of rendering an image with 3D characteristics based on correlation between markup in an image canvas and markup in a shape palette. FIG. 2 is discussed with reference to graphics tool interface 102.

At 202, an image is illustrated that is marked up in an image canvas. In this example, an image file is imported into the image canvas and the user provides markup over the image. This is not required, however, and a user can provide markup to the image canvas without importing an image. In other examples, a user can import a graphic image and provide shape palette markup to impart 3D characteristics to the graphic image by correlating lines and other shapes from the graphic image with the shape palette markup. User markup of the image canvas is illustrated at 204 through 220. The user markup of the image canvas can be classified in two different types of user markup. A first type of user markup is silhouette markup. Silhouette markup denotes regions in the image canvas where the 3D information is tangent to the markup primitive and is consider to lie within the plane of the canvas. For example, if a 2D straight line is drawn as silhouette markup, then the 3D directions that will be associated with that straight-line will be directions perpendicular to that line. This means the 3D information can be computed directly from the 2D image canvas markup, therefore corresponding markup on the shape palette is not necessary. In this example, markups 204 and 206 are silhouette markups and therefore do not require corresponding 3D markup in the shape palette. This is not intended to be limiting, however, and other examples may utilize silhouette markup in both the image canvas and the shape palette.

A second type of user markup is non-silhouette markup. Non-silhouette markup has corresponding markup in the image palette and enables a user to impart 3D visual characteristics to a rendered image. In this example, markups 208 through 220 are non-silhouette markups and have corresponding markups in the shape palette.

Shape palettes are shown at 222 and 224. While these are shown as two separate shape palettes, the images can be displayed together (as shown in FIG. 1). Shape palette 222 represents a Lambertian-shaded image of a convex sphere. Thus, shape palette 222 can be visualized as 3D information extending outward from the plane of the 2D interface. Shape palette 224 represents a Lambertian-shaded image of a concave sphere. Thus, shape palette 224 can be visualized as 3D information extending inward from the plane of the 2D interface (i.e., away from the user's view).

As discussed above, to impart 3D visual characteristics to an image, a user may mark up the image canvas and make corresponding markup to the shape palette. In this example, the user marks up image 202 and makes corresponding markup to shape palettes 222 and 224. For example, the user provides markup 208 to image 202 and provides corresponding markup 226 to shape palette 222. The user then provides markup 210 to image 202 and provides corresponding markup 228 to shape palette 224, and so on for the remaining image and shape palette markups. Thus, in this example, in addition to the previously discussed correspondence, image markup 212 corresponds to shape palette markup 230, image markup 214 corresponds to shape palette markup 232, image markup 216 corresponds to shape palette markup 234, image markup 218 corresponds to shape palette markup 236, and image markup 220 corresponds to shape palette markup 238. In this example, image markups 204 and 206 are silhouette markups and do not require shape palette markup.

Once a user has provided markup to an image canvas (e.g., markup of image 202) and corresponding markup to a shape palette (e.g., shape palettes 222 and 224), a rendered image 240 can be generated using the 3D information extracted from the shape palette(s). In this example, rendered image 240 is rendered based on the markup of image 202 and the corresponding markup of shape palettes 222 and 224.

Illustrative Shape Palette

Figure 3:
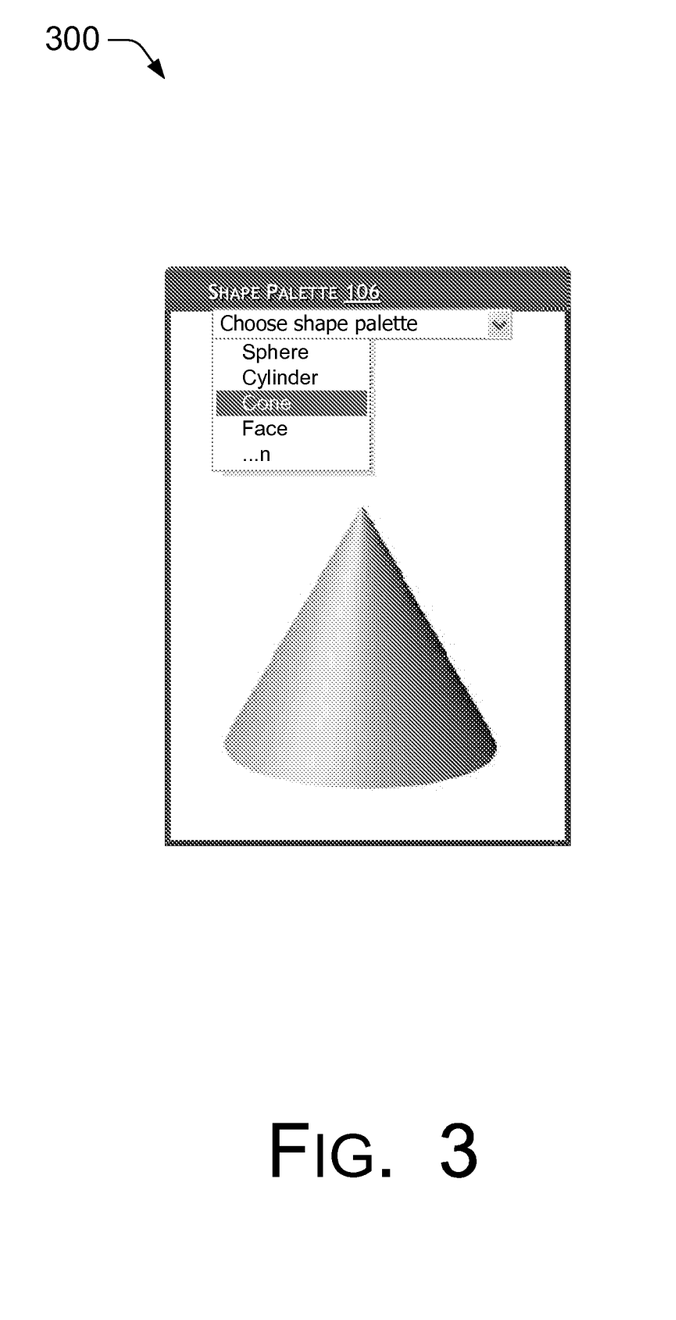

FIG. 3 shows at 300 an illustrative shape palette 106, introduced in FIG. 1. Shape palette 106 enables a user to choose an image or images to use as reference images to impart 3D information to markup in an image canvas. Shape palette 106 can be any suitable image that can be used to extract 3D geometric information. As shown in FIG. 3, examples of shape palettes include a sphere, a cylinder, a cone, a face, and so on. The shape palettes can be Lambertian-shaded to indicate 3D information. The shape palette may also include a drop-down menu or other user interface to allow a user to select the desired shape palette. This example is not intended to be limiting and any suitable type and arrangement of shape palette(s) can be utilized.

Illustrative Processes

Illustrative processes are described in this section with additional reference to FIGS. 1-3. The processes are described in the context of graphics tool interface 102 shown above for convenience only, and the processes are broadly applicable to other interfaces and systems.

The illustrative processes may be described in the general context of computer executable instructions and are illustrated as collections of blocks in logical flowcharts, which represent sequences of operations that can be implemented in hardware, software, or a combination thereof. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

Figure 4:
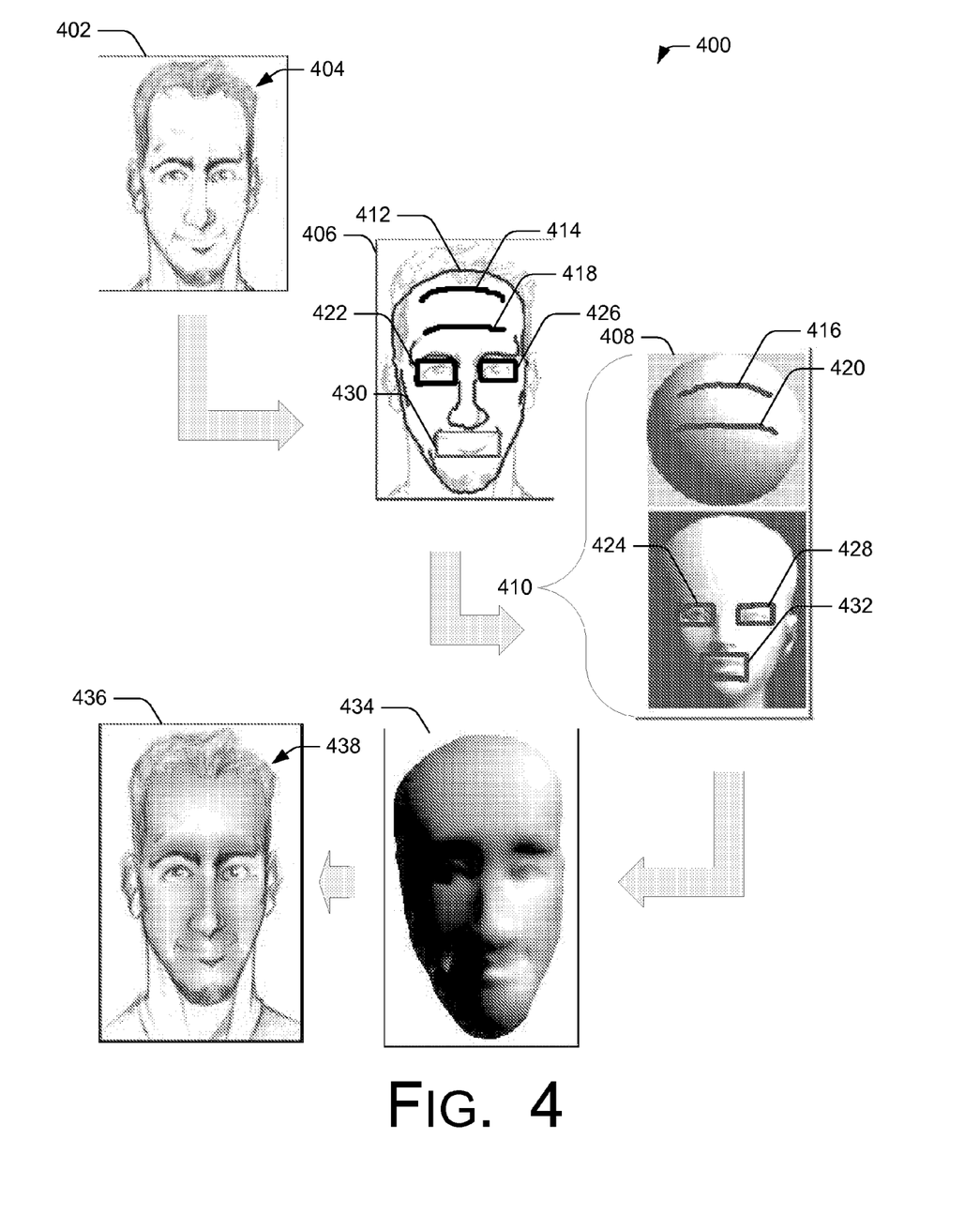

FIG. 4 illustrates at 400 a process for imparting 3D characteristics to an image in a 2D space. At 402, image 404 is imported to an image canvas. At 406, the image canvas is marked up using image 404 as a stencil. At 408, a shape palette 410 is marked up with markup that corresponds to the markup of image 404 at 406. The illustrated shape palette includes a sphere and a face. The face shape palette contains typical 3D aspects of facial features, such as eye sockets, a nose, a mouth, and so on. The "face palette" can be used to mark up a more detailed facial image, such as image 404, to give the facial image 3D characteristics.

Markup 412 of image 404 is a silhouette markup and, in this example, does not require corresponding 3D markup in shape palette 410. Other markups are non-silhouette markups and thus have corresponding markups in shape palette 410. The correspondence of image 404 markup and shape palette 410 markup is as follows: Image markup 414 corresponds to shape palette markup 416; Image markup 418 corresponds to shape palette markup 420; Image markup 422 corresponds to shape palette markup 424; Image markup 426 corresponds to shape palette markup 428; and Image markup 430 corresponds to shape palette markup 432. Based on the markup correspondence, 3D information is extracted from the shape palettes and imparted to the image markups, at 434, to render an image with the 3D characteristics. At 436, the rendered image is used to relight image 404 and create image 438 that displays 3D characteristics. Thus, the discussed techniques can be used to impart 3D characteristics to 2D images.

Figure 5:
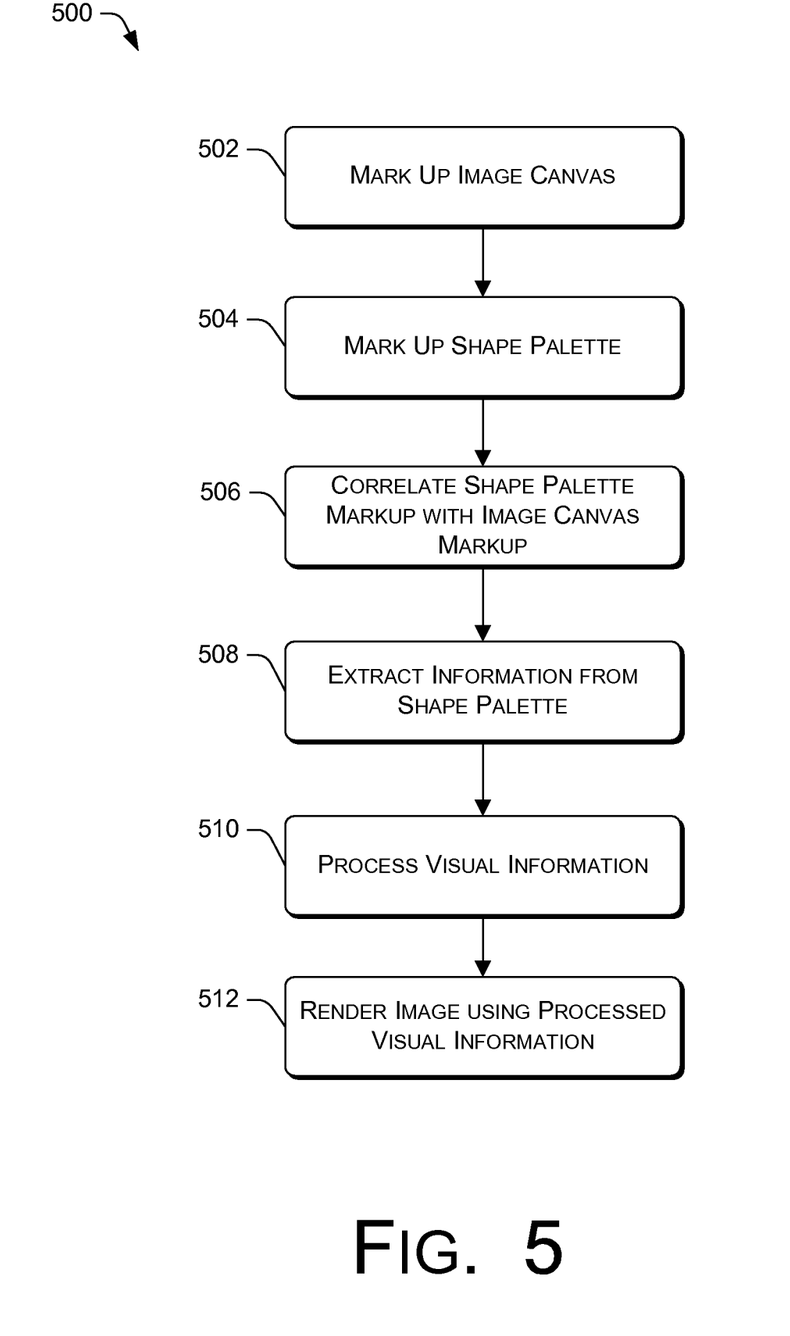

FIG. 5 illustrates, at 500, an exemplary process for imparting 3D visual characteristics to an image based on user markup. At 502, a user provides markup in an image canvas. In one example, an image file can be loaded and an image from the image file displayed in the image canvas. In some examples, act 502 can include tracing, importing, and/or otherwise receiving user markup in an image canvas. At 504, the user marks up a shape palette to correspond with the image canvas markup. Thus, the user markup of the image canvas and the shape palette can be said to indicate data points within the image canvas and the shape palette. At 506, the shape palette markup is correlated with the corresponding image canvas markup. The image canvas markup and the shape palette markup can be provided in a "tit-for-tat" fashion such that after a user provides a particular stroke, line or image in the image canvas, the user then provides a corresponding markup in the shape palette. Other implementations may utilize different ways of correlating image canvas markup with shape palette markup, such as color-based correlation. For example, all markup of a specific color in the image canvas may be correlated with markup of the same or similar color in the shape palette. In other examples, the markup in the image canvas and the shape palette may not be provided in a "tit-for-tat" fashion, and the image canvas may be partially or completely marked up before the shape palette receives user markup. In that case, strokes in the image canvas may subsequently be correlated with strokes in the shape palette.

At 508, 3D information is extracted from the shape palette based on the user markup of the shape palette. The 3D information can include geometric information, such as normal values (e.g., in terms of x, y and z coordinates) and pixel values (e.g., brightness) for each point indicated in the user markup of the shape palette. At 510, the 3D information is processed to produce data that can generate an image with 3D characteristics. In some examples, normal values extracted from the shape palette are warped to the image canvas markup using geometric techniques such as thin-plate splines. At 512, an image with 3D characteristics is rendered using the data.

Figure 6:
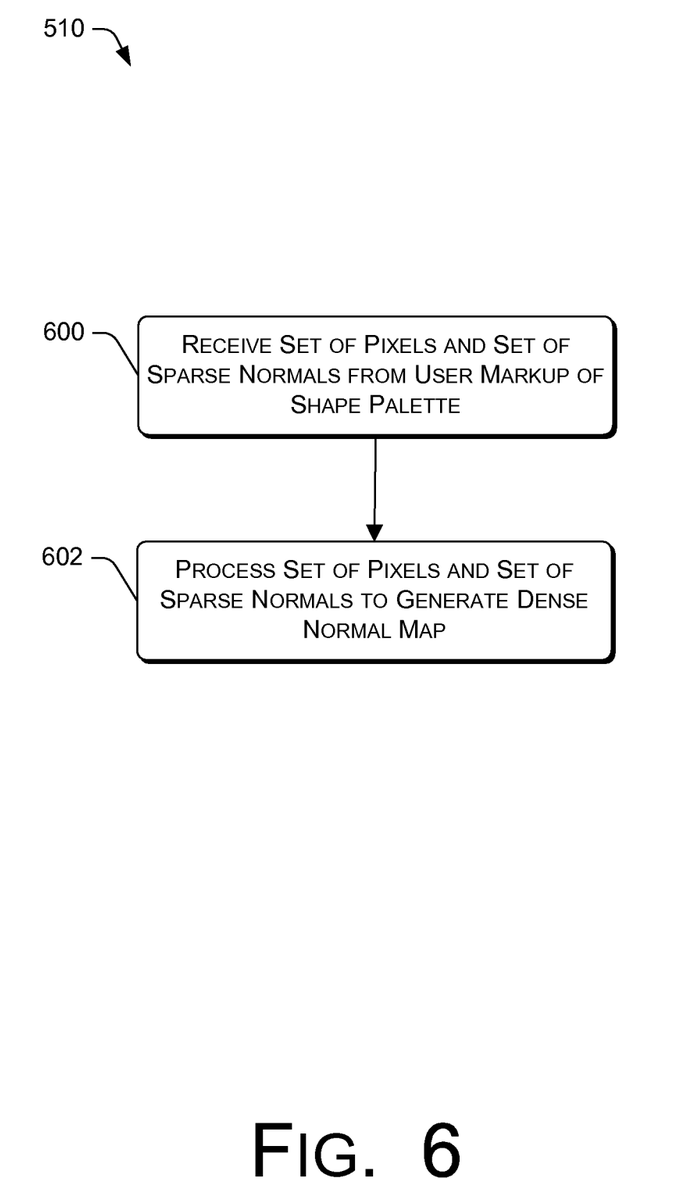

FIG. 6 illustrates more detailed aspects of one illustrative implementation of act 510, discussed above with reference to FIG. 5. The process shown at 510 is one process for generating an image with 3D characteristics using a sparse set of normals indicated by user markup of a shape palette. At 600, a set of normals and a set of pixels indicated by user markup of a shape palette are received. At 602, the set of normals and the set of pixels are processed to produce a dense normal map that can then be used to render an image with 3D characteristics. For purposes of example, one method of processing the set of pixels and the set of sparse normals is presented below.

A normal represents a 3D direction in Euclidean space and can be expressed as $n=[x,y,z]^T$. A unit normal is a normal whose x, y, and z components are of length one, i.e. $1=\sqrt{x^2+y^2+z^2}$. An alternative representation of a normal may be denoted as $$n = \frac{1}{\sqrt{p^2+q^2+1}}[-p\ -q\ 1]^T,$$

where $$p = -\frac{x}{z}$$

and $$p = -\frac{y}{z}$$

associated with a unit normal $[x,y,z]^T$. Consider now we have an image, where each pixel is denoted by i, and we wish to have a normal associated with that pixel. We can denote each normal in the image $$n_i = \frac{1}{\sqrt{p_i^2+q_i^2+1}}[-p_i\ -q_i\ 1]^T.$$

The shape palette can be considered as an image that has a normal at every pixel. The aforementioned markup procedure provides a way for the user to transfer the normals from the shape palette to the image canvas. In some cases, this transfer via markup is very sparse, and the goal is to compute a dense normal image based on the sparse markup. The following illustrative method shows one way to estimate the $p_i$ component of the normal $n_i$ for all pixels in an image rendered with 3D characteristics. The same method can be used to estimate $q_i$.

Consider an image that is a set of normal values, $G=\{p_i| i \in 1 \ldots N\}$. G is a set of p's and N is the total number of pixels of the canvas. G can be estimated using the sparse set of normal values generated by user markup of the shape palette. The set of normal values generated by user markup of the shape palette is represented by the observation set $O=\{\tilde{p}_k | k \in S\}$, where $\tilde{p}_k$ is known and S is the set of corresponding pixel locations. G can be obtained by solving the following associated energy function:

$$E(G) = \log(P(O|G)) + \log(P(G)) \quad (1)$$

where $(P(O|G))$ is the likelihood and $(P(G))$ is the prior. The likelihood can be defined as:

$$P(O|G) = \prod_{k \in S} \exp\left(-\frac{\|p_k - \tilde{p}_k\|^2}{2\sigma_1^2}\right) \quad (2)$$

which measures the faithfulness of the output normal map to the input O; the prior P(G) is defined as:

$$\prod_i \prod_j \exp\left(-\frac{\|p_i - p_j\|^2}{2\sigma_2^2}\right) \prod_i \exp\left(-\frac{\left\|\sum_j p_j - 4p_i\right\|^2}{2\sigma_3^2}\right) \quad (3)$$

where $\sigma_1, \sigma_2, \sigma_3$ are the respective uncertainty measurements, and $j \in N(i)$ is the pixel locations of the first-order neighbors, that is surrounding pixels, of pixel i. The likelihood energy measures the faithfulness of the output dense normal map to the input O. The first exponent in the prior energy (3) enforces the smoothness of the normal orientation, while the second exponent minimizes the surface curvature corresponds to the output dense normal map. The values $\sigma_1, \sigma_2, \sigma_3$ can be set by the user, which indicates the weight or importance of the associated exponents. The energy function (1) is convex with the above likelihood and prior definitions, and the associated optimization thus converges to a global optimal solution. Standard numerical optimization packages can be used to solve equation (1). From this dense normal map, G, estimated using equation (1), a 3D surface or height map can be generated using standard shape-from-normal estimation techniques.

Illustrative Apparatus

Figure 7:
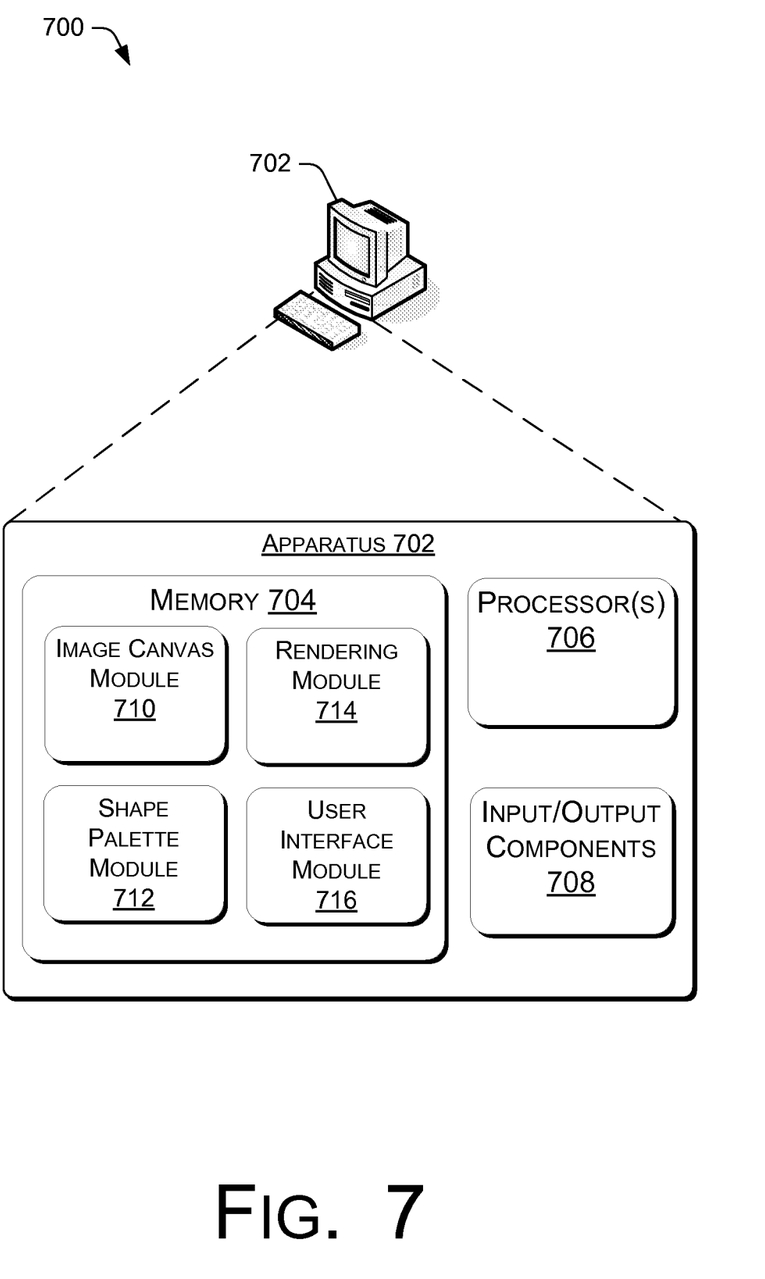

FIG. 7 illustrates, at 700, one example of an apparatus 702 that can implement the discussed processes and techniques. While illustrated as a desktop computer, apparatus 702 can include any suitable device, including a personal computer, a laptop computer, a personal digital assistant (PDA), a cellular phone, and so on.

Apparatus 702 includes a system memory 704, processor(s) 706, and input/output components 708. Processor(s) 706 may include, for example, microprocessors, microcomputers, microcontrollers, multi-core processors, and so forth. Processor(s) 706 are configured to retrieve and execute computer-program instructions stored in system memory 704. System memory 704 includes computer-readable media in the form of volatile memory, such as Random Access Memory (RAM) and/or non-volatile memory, such as Read Only Memory (ROM) or flash RAM. Input/output components 708 (e.g., a mouse and keyboard) provide data input and output capabilities for apparatus 702.

Embodied on system memory 704 are programming modules that can implement the discussed processes and techniques. Image canvas module 710 generates an image canvas and receives user markup of the image canvas. The image canvas module 710 can also import and export images as part of the image markup process. Shape palette module 712 generates and/or retrieves shape palettes and receives user markup of shape palettes. Rendering module 714 processes user markup of an image canvas and a shape palette to render an image with 3D characteristics. In some examples, rendering an image with 3D characteristics includes displaying the image. User interface module 716 generates and/or displays user interfaces that enable a user to interact with the apparatus and implement the discussed processes and techniques.

While various illustrative device and operating implementations have been described, the components, modules, and features of these implementations may be rearranged, modified, and/or may be omitted entirely, depending on the circumstances.

Also, it should be understood that certain acts in the methods need not be performed in the order described, may be rearranged, modified, and/or may be omitted entirely, depending on the circumstances.

Moreover, any of the acts described above with respect to any method may be implemented by a processor or other computing device based on instructions stored on one or more computer-readable media. Computer-readable media can be any available media that can be accessed locally or remotely by the resource modeling application. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the resource modeling application. Combinations of the any of the above should also be included within the scope of computer-readable media.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention.

What is claimed is:
1. A method comprising:
   receiving, by a device including a processor, a graphical image in a two-dimensional space;
   receiving, by the device, selection of a shape palette from a plurality of shape palettes, each of the plurality of shape palettes comprising a two-dimensional representation of a different three-dimensional shape;
   presenting, by the device, a user interface including the shape palette and the graphical image;

imparting characteristics of three-dimensionality to the graphical image, by the device, based on processing a set of pixels and a set of normal values extracted based on user markup of a plurality of points on the shape palette such that the shape palette comprises a Lambertian-shaded image; and rendering, by the device, the graphical image with the characteristics of three-dimensionality.

2. A method as recited in claim 1, wherein the receiving the graphical image comprises loading an image file into the two-dimensional space.

3. A method as recited in claim 1, wherein the shape palette comprises an orthographic projection of a shape model.

4. A method as recited in claim 1, wherein the shape palette comprises a sphere.

5. A method as recited in claim 1, wherein the shape palette comprises a plurality of pixels, each of the plurality of pixels associated with a normal value.

6. A tangible computing device storage media including computer executable instructions that are executable by a processor to perform acts comprising:

generating a shape palette, the shape palette comprising a two-dimensional visual representation of geometric information in three dimensions;

receiving user markup of the shape palette to extract a set of geometric information from the two-dimensional visual representation that is applied at least to render a visual image, the user markup of the shape palette including at least one of a strokes line or curve traced, by the user, on the shape palette;

imparting characteristics of three-dimensionality to the visual image based on the user markup of the shape palette; and rendering the visual image with the three dimensional characteristics based at least in part on the set of geometric information, a two-dimensional graphic image, and user markup of the two-dimensional graphic image, the set of geometric information including at least a plurality of brightness values.

7. A tangible computing device storage media as recited in claim 6, wherein the shape palette comprises an orthographic projection that incorporates Lambertian shading.

8. A tangible computing device storage media as recited in claim 6, wherein the shape palette comprises one or more of a concave sphere and a convex sphere.

9. A tangible computing device storage media as recited in claim 6, wherein the set of geometric information comprises a plurality of pixels and a plurality of normal values, each of the plurality of pixels associated with one of the plurality of normal values.

10. A tangible computing device storage media as recited in claim 9, wherein the rendering the visual image comprises deriving a dense normal map from the plurality of pixels and the plurality of normal values.

11. A tangible computing device storage media as recited in claim 6, wherein the rendering the visual image comprises:

receiving the user markup of the two-dimensional graphic image; and correlating the user markup of the two-dimensional graphic image with the user markup of the shape palette.

12. An apparatus comprising:

a processor;

a canvas module executable by the processor to utilize an image file as a stencil for user markup and generate a user canvas, the user canvas to receive the user markup on the user canvas, the user markup on the user canvas including freeform graphic input shown on the user canvas;

a shape palette module executable by the processor to generate a shape palette and configured to receive user markup of the shape palette, the shape palette comprising a two-dimensional visual representation of three-dimensional geometric information, the user markup of the shape palette including freeform graphic input shown on the shape palette, and the user markup of the shape palette extracting a set of geometric information from the shape palette comprising an orthographic projection incorporating a Lambertian shading that is applied at least in part to render a graphical image; and a rendering module executable by the processor to process the set of geometric information to produce a data set and to render an image with three-dimensional visual characteristics based at least in part on the data set.

13. An apparatus as recited in claim 12, wherein the set of geometric information comprises a plurality of normal values.

14. An apparatus as recited in claim 12, further comprising a user interface module executable by the processor to display the user canvas and the shape palette.

15. An apparatus as recited in claim 12, wherein:

the freeform graphic input is used to extract a set of pixels and a set of normal values from the shape palette; and the rendering module processes the set of pixels and the set of normal values to render the image with three-dimensional visual characteristics.

* * * * *